(12) United States Patent
Cooper

(10) Patent No.: US 12,054,122 B1
(45) Date of Patent: Aug. 6, 2024

(54) VEHICLE CARGO TRANSPORT SYSTEM

(71) Applicant: Arthur Brad Cooper, Selma, NC (US)

(72) Inventor: Arthur Brad Cooper, Selma, NC (US)

(*) Notice: Subject to any disclaimer, the term of this patent is extended or adjusted under 35 U.S.C. 154(b) by 0 days.

(21) Appl. No.: 18/609,913

(22) Filed: Mar. 19, 2024

(51) Int. Cl.
*B60R 9/042* (2006.01)

(52) U.S. Cl.
CPC .................................. *B60R 9/042* (2013.01)

(58) Field of Classification Search
CPC ............ B60R 9/042; B60R 9/045; B60R 9/00
See application file for complete search history.

(56) References Cited

U.S. PATENT DOCUMENTS

| | | | | |
|---|---|---|---|---|
| 3,531,006 A * | 9/1970 | Farchmin | ................ | B60R 9/042 414/462 |
| 4,339,223 A * | 7/1982 | Golze | ................ | B60R 9/042 224/310 |
| 4,439,086 A * | 3/1984 | Thede | ................ | B60R 9/08 224/310 |
| 4,887,750 A * | 12/1989 | Dainty | ................ | B60R 9/0423 224/310 |
| 5,360,150 A * | 11/1994 | Praz | ................ | B60R 9/042 224/310 |
| 5,423,650 A * | 6/1995 | Zerbst | ................ | B60R 9/042 224/310 |
| 5,535,929 A * | 7/1996 | Neill | ................ | B60R 9/042 224/310 |
| 5,560,525 A * | 10/1996 | Grohmann | ................ | B60R 9/06 224/325 |
| 6,179,543 B1 * | 1/2001 | Adame | ................ | B60R 9/0423 224/310 |
| 6,308,874 B1 * | 10/2001 | Kim | ................ | B60R 9/042 224/310 |
| 6,427,888 B1 * | 8/2002 | Condon | ................ | B60R 9/042 224/310 |
| 6,715,652 B2 * | 4/2004 | Kmita | ................ | B60R 9/06 224/310 |
| 6,766,928 B2 * | 7/2004 | Aftanas | ................ | B60R 9/06 224/310 |
| 9,987,995 B2 * | 6/2018 | Paunov | ................ | B60R 9/0423 |
| 11,414,020 B2 * | 8/2022 | Daniels | ................ | B60R 9/048 |
| 2006/0285954 A1 * | 12/2006 | Neary | ................ | B60R 9/042 414/465 |
| 2013/0315693 A1 * | 11/2013 | Diverdi | ................ | B60P 3/40 414/800 |
| 2015/0069101 A1 * | 3/2015 | Presley | ................ | B60R 9/042 224/310 |
| 2018/0257577 A1 * | 9/2018 | Livingston | ................ | B60R 9/042 |
| 2024/0101038 A1 * | 3/2024 | Liffring | ................ | B60R 9/042 |

\* cited by examiner

*Primary Examiner* — Brian D Nash
(74) *Attorney, Agent, or Firm* — Ashley D. Johnson; Dogwood Patent and Trademark Law

(57) ABSTRACT

The invention is a transport system comprising a track positioned vertically and horizontally on the rear and top, respectively, of a vehicle. One or more roller carts cooperate with the track and are configured to enable cargo to be moved from ground level to the vehicle roof for storage and transport to a desired destination. A winch is used to physically hoist the cart along the track to load and unload the cargo from the vehicle roof. Thus, the transport system is operatively deployed upon a vehicle and is selectively movable to allow a user to easily and quickly load and unload cargo to and from the vehicle roof.

20 Claims, 19 Drawing Sheets

VEHICLE CARGO TRANSPORT SYSTEM

FIELD OF THE INVENTION

The presently disclosed subject matter is generally directed to a transport system that allows for a wide range of cargo to be stored and removed from a vehicle top surface.

BACKGROUND OF THE INVENTION

The roof of a vehicle is a convenient way to stow, hold, and transport cargo that is too large and/or bulky to fit inside the vehicle interior. As such, various vehicle rooftop holders, racks, and carriers have been developed. Typically, such systems include a pair of side rails or slats that are fixedly secured to the roof portion of the vehicle. A pair of cross bars are typically attached to the side rails or slats to extend transversely therebetween. The cargo is then positioned on the cross bars and secured down via suitable straps or bungee cords. However, conventional vehicle rooftop carriers are often difficult and impractical to use. For example, it is often challenging to lift cargo onto and out of a carrier positioned on the roof of a vehicle. As a result, it may require several people working together to position cargo in a rooftop carrier. Further, the roofs of many modern vehicles are well above the height of an average adult human, making lifting even more challenging. Removing cargo from the vehicle carrier can be equally difficult depending on the specific cargo and its weight. It would therefore be beneficial to provide a cargo transport system that overcomes the shortcomings of prior art carriers.

SUMMARY OF THE INVENTION

The presently disclosed subject matter is directed to a cargo transport system. Particularly, the system comprises a track defined by a first end and an opposed second end with a length therebetween. The track includes a pair of first and second rails attached with a plurality of cross members that extend between the first and second rails. Each rail includes a groove that extends along the length of the track. The length of the track comprises a first region with a vertical or about vertical orientation and a second region with a horizontal orientation, and a transitional curved region positioned between the first and second regions. The system includes one or more carts, each comprising a plurality of wheels, each wheel configured to be housed within a track groove. Each cart also includes an attachment. The system includes a bumper positioned at one end of the track, adjacent to the second region, wherein the bumper acts as a track stop. The system includes a winch comprising a cable configured to be wound and unwound from the winch, each cable including a clip releasably coupled to the cart attachment. The winch is positioned adjacent to the bumper.

In some embodiments, the track has a length of about 10-30 feet and/or a width of about 1-5 feet.

In some embodiments, the cargo transport system comprises a track extension positioned at the track first vertical region, wherein the track extension includes a first angled end and an opposed horizontal second end, and wherein the track extension is releasably attached to the first vertical region.

In some embodiments, each rail includes a first side and an opposed second side, and the groove is positioned between the first and second sides or the groove is positioned at the first or second side.

In some embodiments, the track first region is configured to releasably attach to a vehicle, and wherein the track second region is configured to permanently attach to the vehicle.

In some embodiments, each rail includes a first side and an opposed second side, and the groove is positioned between the first and second sides.

In some embodiments, each rail includes a first side and an opposed second side, and wherein the groove is positioned at the first or second side.

In some embodiments, each cart comprises a sidewall that extends upwards from a bottom face of the cart to form an open top that extends into an interior.

In some embodiments, the cart further comprises a lid.

Ins some embodiments, the cart is configured to rotate 90 degrees on demand. In some embodiments, the cart is configured as a flat device with a base, the base defined a top surface and an opposed bottom surface that includes the wheels.

In some embodiments, the presently disclosed subject matter is directed to a method of transporting cargo from a first location to a second location. Particularly, the method comprises positioning the cargo on or in a cart of the disclosed cargo transport system at a first location. The method includes unwinding the winch cable from the winch and attaching the winch cable clip to the cart attachment. The method includes positioning a cart wheel within each rail groove at the first region of the track. The method includes initiating the winch to retract the winch cable towards the winch, whereby the cart is moved along the first region of the track to the second region of the track to contact the bumper at a second location. The cargo is transported from the first location to the second location.

In some embodiments, the first location is the ground or a floor and the second location is the roof of a vehicle.

In some embodiments, the method includes strapping the cargo to the cart using straps, cords, hook and loop closure, or combinations thereof.

In some embodiments, the first region of the track is positioned adjacent to a rear of a vehicle.

In some embodiments, the second region of the track is positioned adjacent to the roof of a vehicle.

In some embodiments, the method includes placing a lid on the cart prior to positioning the cart wheels within each rail groove.

In some embodiments, the presently disclosed subject matter is directed to a method of transporting cargo from the ground to a roof of a vehicle. Particularly, the method comprises positioning the cargo on or in a cart of the disclosed cargo transport system, the cart placed on the ground. The method includes unwinding the winch cable from the winch and attaching the winch cable clip to the cart attachment. The method includes positioning a cart wheel within each rail groove at the first region of the track. The method includes initiating the winch to retract the winch cable towards the winch, whereby the cart is moved along the first region of the track to the second region of the track to contact the bumper at the vehicle roof, whereby the cargo is transported from the ground to the vehicle roof.

DETAILED DESCRIPTION OF THE INVENTION

Figure 1A:
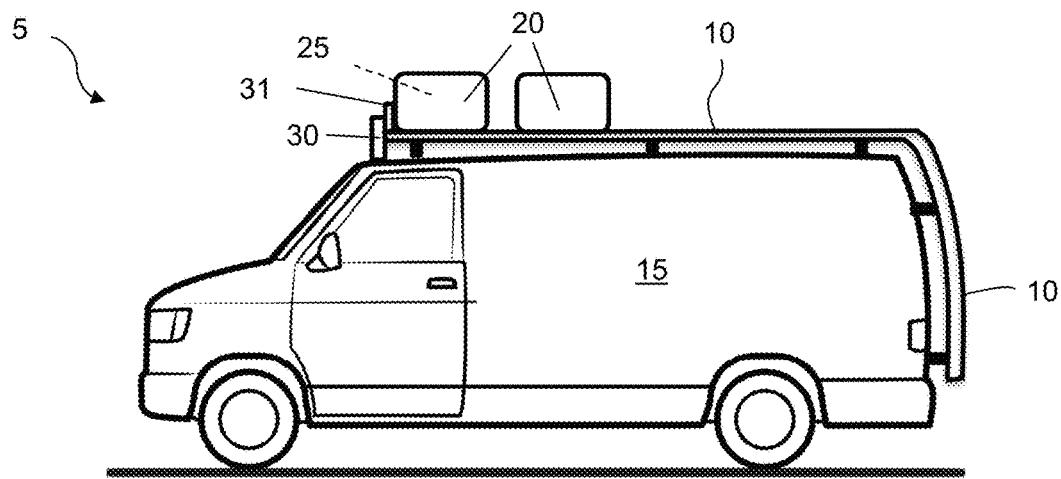
FIG. 1a is a side plan view of a cargo transport system in use with a vehicle in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to a cargo transport system that can be easily and effectively used with a wide variety of vehicles. The term "vehicle" as used herein broadly includes any motorized structure that can be used to transport objects or people a desired distance. Suitable vehicles can include (but are not limited to) cars, trucks, vans, SUVs, campers, trailers, and military vehicles (e.g., tanks and the like). Similarly, the term "cargo" can broadly include any item or object that can be transported by a vehicle as disclosed herein (e.g., luggage, boxes, kayaks, canoes, groceries, tents, packaged items).

Figure 1B:
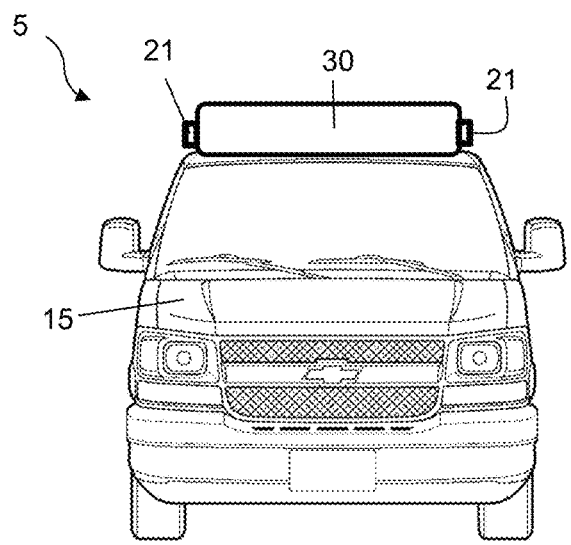
FIG. 1b is a front plan view of the system of FIG. 1a in accordance with some embodiments of the presently disclosed subject matter.
Figure 1C:
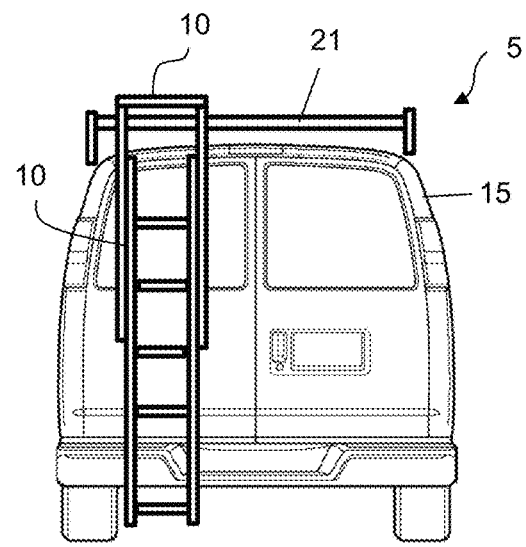
FIG. 1c is a rear plan view of the system of FIG. 1a in accordance with some embodiments of the presently disclosed subject matter.

As shown in FIGS. 1a-1c, transport system 5 includes track 10 that can be positioned vertically and horizontally on the rear and top, respectively, of vehicle 15. One or more roller carts 20 cooperate with the track and are configured to enable cargo 25 to be moved from ground level to the vehicle roof for storage and transport to a desired destination. Bumper 30 is used to provide a stop for the carts, and winch 31 is used to physically hoist the cart along track 10. Thus, cargo 25 is strapped into the interior of a roller cart and positioned onto a vertical region of track 10 using a winch clip. Once the roller cart is in place, the winch can be activated and cart 20 is transported along the track vertical and horizontal regions to the roof of the vehicle. In some embodiments, the system can be used with a conventional roof rack or other support 21. Thus, transport system 5 is operatively deployed upon vehicle 15 and is selectively movable to allow a user to easily and quickly load and unload cargo to and from the vehicle roof.

Figure 2A:
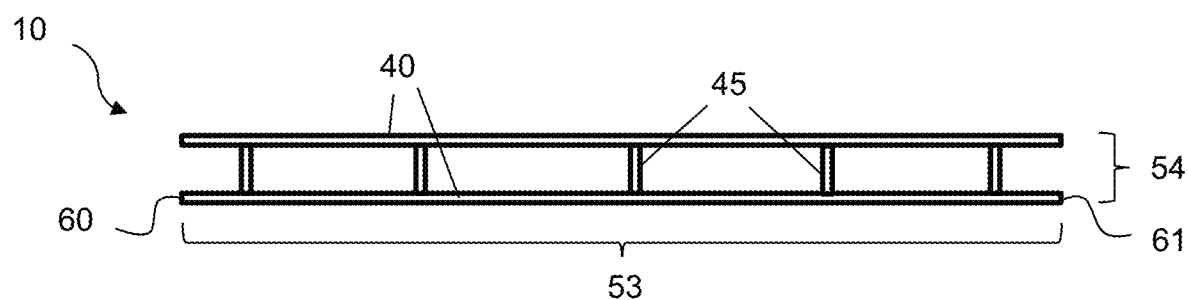
FIG. 2a is a top plan view of a system track in accordance with some embodiments of the presently disclosed subject matter.

As noted above, transport system 5 includes track 10 that spans the rear and top of a corresponding vehicle. The term "track" broadly refers to a path or course along which a cart moves. FIG. 2a illustrates one embodiment of a track comprising a pair of elongated lateral rails 40 connected to each other by cross members 45. Track 10 can have any suitable dimensions, such as length 53 of about 10-30 feet (e.g., at least/no more than about 10, 15, 20, 25, or 30 feet). The term "length" refers to the longest straight-line distance between track first and second ends 60, 61. The track can have any desired width 54 (e.g., the distance between rails 40), such as about 1-5 feet (e.g., at least/no more than about 1, 2, 3, 4, or 5 feet). It should be appreciated that the dimensions of the track are not limited and can be varied according to the size/shape of vehicle 15.

Figure 2B:
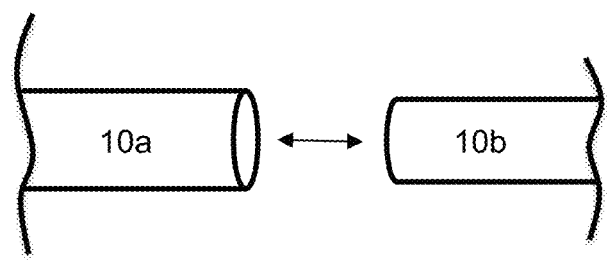
FIGS. 2b and 2c are fragmentary views illustrating track segments configured to connect and detach in accordance with some embodiments of the presently disclosed subject matter.
Figure 2C:
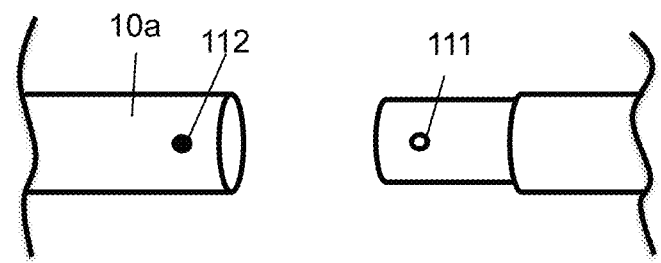
Figure 2D:
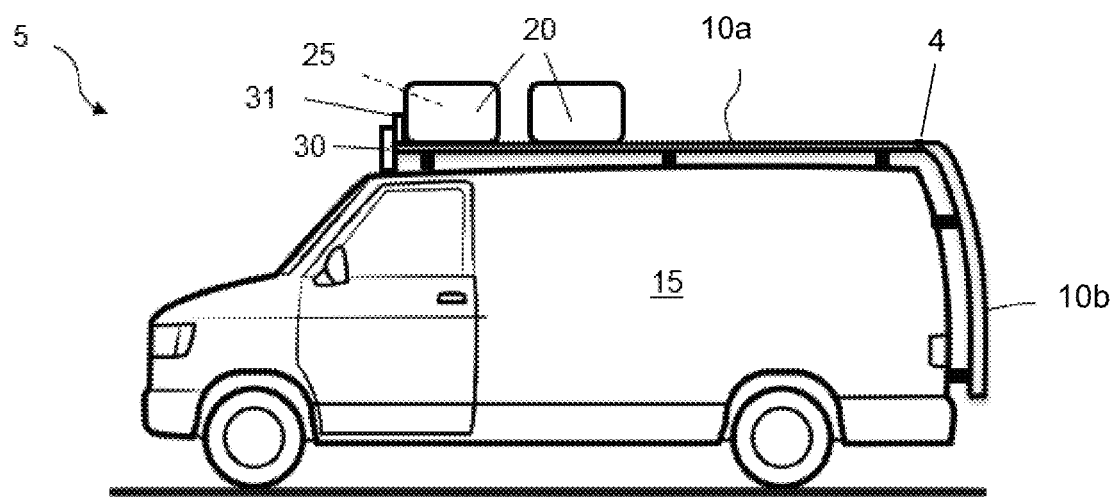
FIG. 2d is a side plan view of a cargo transport system with a detachable track in use with a vehicle in accordance with some embodiments of the presently disclosed subject matter.

In some embodiments, track 10 can be configured as a single length of track that extends about the top and side of a corresponding vehicle. In other embodiments, the track can include one or more segments 10a, 10b that releasably attach together. For example, first segment 10a can include an interior opening sized and shaped for attachment with second segment 10b as shown in FIG. 2b. A small button 111 on the second segment can be pressed to lock into the interior of segment 10a via cooperating opening 112 in some embodiments. However, it should be appreciated that any conventional method of attaching various track segments together can be used. The detachment location(s) of track 10 can be positioned at any location. As illustrated in FIG. 2d, it may be beneficial to configure track segments 10a and 10b to attach/detach at junction 4 between the top and rear portions of the track as shown in FIG. 2c. Thus, the track can be detached from any desired vehicle (e.g., a van, SUV, small compact vehicle with a roof rack).

Figure 3A:
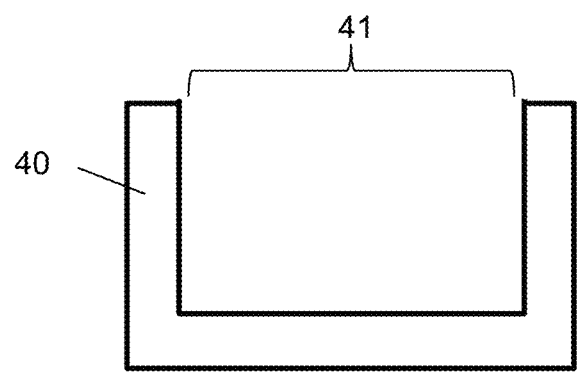
FIG. 3a is a cross-sectional view of a system track in accordance with some embodiments of the presently disclosed subject matter.
Figures 3B, 3C:
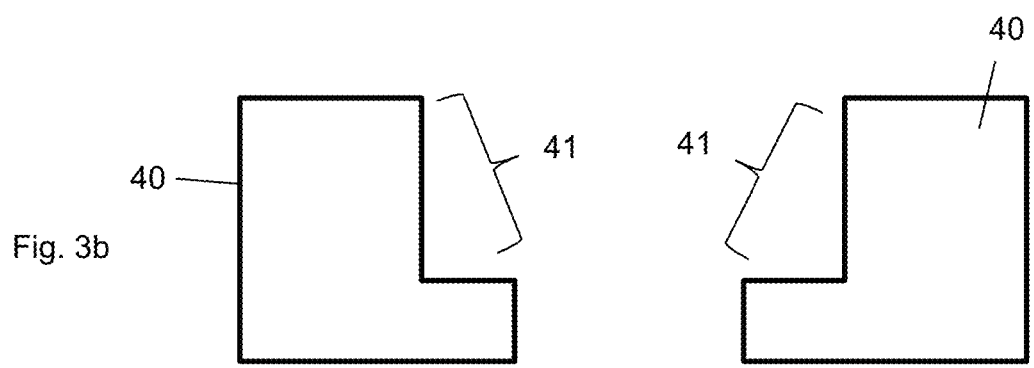
FIGS. 3b and 3c are cross-sectional views of system tracks in accordance with some embodiments of the presently disclosed subject matter.

The first and second rails each cooperate with wheels or other cart elements, allowing cart 20 to advance along the track. For example, each side rail 40 can include groove 41 sized and shaped to accommodate a wheel from a cart, as shown in FIGS. 3a-3c. The groove can be positioned along the length of each rail. In this way, the cart can travel the length of the rail.

Figure 4A:
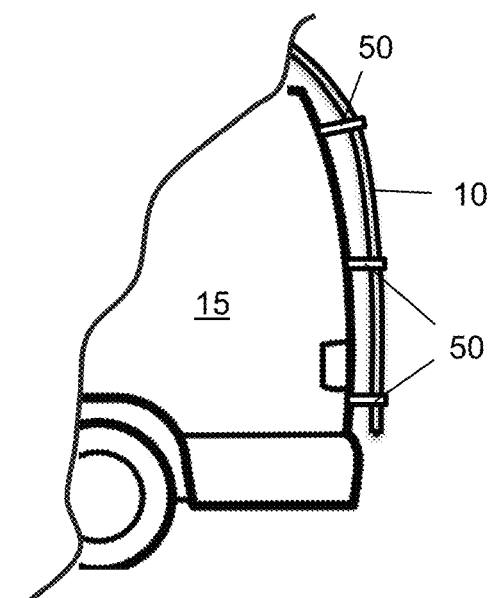
FIG. 4a is a fragmentary side plan view of a system track in accordance with some embodiments of the presently disclosed subject matter.

Side rails 40 of the track are adapted to be fixedly secured to the rear and roof of vehicle 15. Thus, the system can include one or more connectors 50 that allow for permanent or releasable attachment of the track to a surface of vehicle 15, as illustrated in FIG. 4a. In this way, the track does not directly contact vehicle 15. The term "connector" broadly includes any element that allows connection between a track and the surface of a vehicle. Suitable connectors can include (but are not limited to) feet, legs, braces, clamps, grips, extensions, adaptors, fasteners, and equivalent connection elements. Once the track is attached to vehicle 15 using the connector, it does not move and remains in place until a desires to remove the track (e.g., for replacement or repair). For example, all or a portion of the track can be permanently attached to vehicle 15 for heavy use. Alternatively, all or a portion of the track can be removable from vehicle 15 (e.g., for small SUVs or small compact vehicles with a roof rack that does not require extra heavy use). Advantageously, a removable track allows a vehicle hatchback or door to open on a van, SUV, or compact vehicle. Thus, cargo can be loaded onto the roof of a vehicle using system 5. A portion of the track (e.g., the portion on the rear of the vehicle) can then be removed and stored away at any desired location (e.g., the interior of the vehicle, a storage shed, garage, etc.).

Figure 4B:
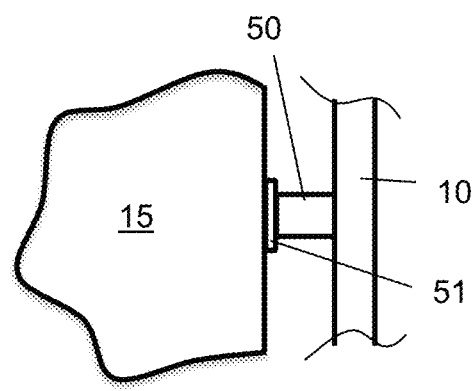
FIG. 4b is a fragmentary side view of a track connection in accordance with some embodiments of the presently disclosed subject matter.
Figure 4C:
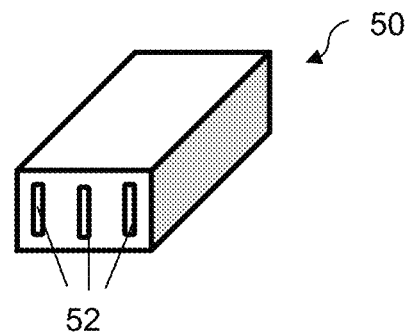
FIG. 4c is a perspective view of the bottom face of a system connector in accordance with some embodiments of the presently disclosed subject matter.

Optionally, resting element 51 (such as a gripping sleeve or a plastic or rubber element or coating) can be provided on a terminal leg section of the connector to facilitate stabilizing the track against a surface of the vehicle, as shown in FIG. 4b. Alternatively or in addition, the connector can include one or more traction elements 52 (including rubber grips or the like) configured that directly contact vehicle 15, as shown in FIG. 4c. Because the resting element and/or traction elements are configured to contact vehicle 15, these elements function to both stabilize the track/connector and prevent or minimize damage to the vehicle.

Figure 5A:
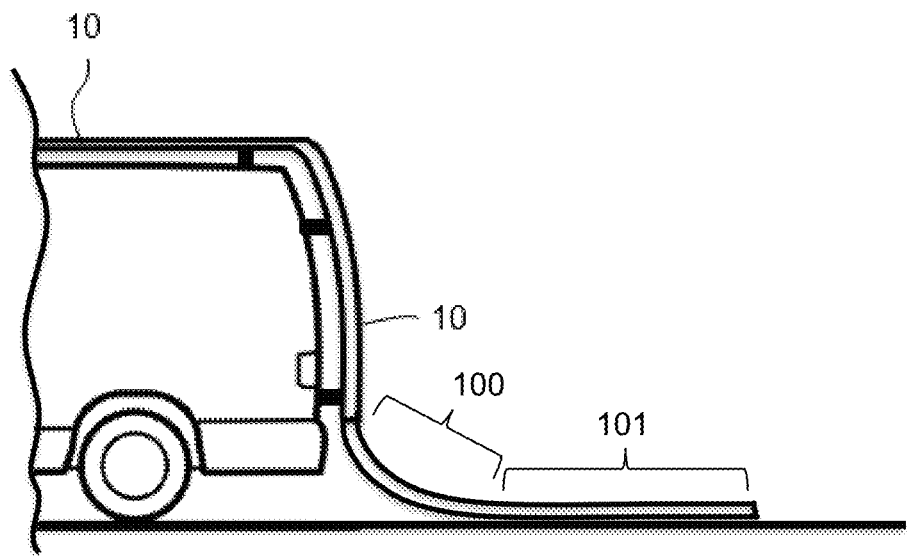
FIG. 5a is a fragmentary side view of a track extension in accordance with some embodiments of the presently disclosed subject matter.
Figure 5B:
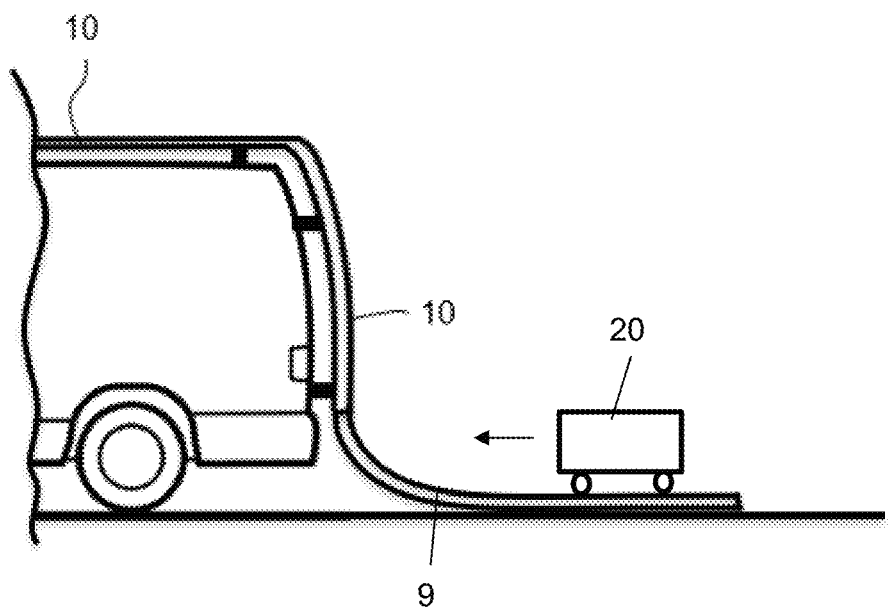
FIG. 5b is a fragmentary side view of a track extension and cart in use in accordance with some embodiments of the presently disclosed subject matter.

In some embodiments, track 10 can include extension 9 that releasably attaches at the lower end of the rear portion of the track, as illustrated in FIG. 5a. The extension allows cargo to be easily and quickly loaded onto the track for positioning on the roof of a vehicle as discussed herein. The extension can be releasably attached an end of the track positioned adjacent to the ground at the rear of the vehicle. Any mechanism that allows for releasable connection can be used (e.g., mechanical elements, telescoping arrangement, etc.). As shown, the extension can include angle 100 relative to the ground or a supporting surface. In some embodiments, the angled region can transition about 90 degrees from the approximate vertical portion of the track on the rear of the vehicle to the about horizontal region of the extension, as illustrated. The horizontal region 101 can have any suitable length, such as about 4 feet (e.g., about 2, 2.25, 2.5, 2.75, 3, 3.25, 3.5, 3.75, 4, 4.25, 4.5, 4.75, 5, 5.25, 5.5, 5.75, or 6 feet). A cart can be positioned on the extension horizontal region and travel up angled region 100 to provide for easy attachment to track 10, as shown in FIG. 5b. The extension may be beneficial for heavy items, such as full coolers or items that have excessive weight (e.g., weighing eighty pounds or more). Thus, the cart can be attached to the horizontal region of the extension and then attached to the winch as described herein. The cart then advances along the horizontal region to the angled region to attach to track 10 positioned on the rear of vehicle 15. The track can then be advanced along the track to the roof of the vehicle.

Figure 6:
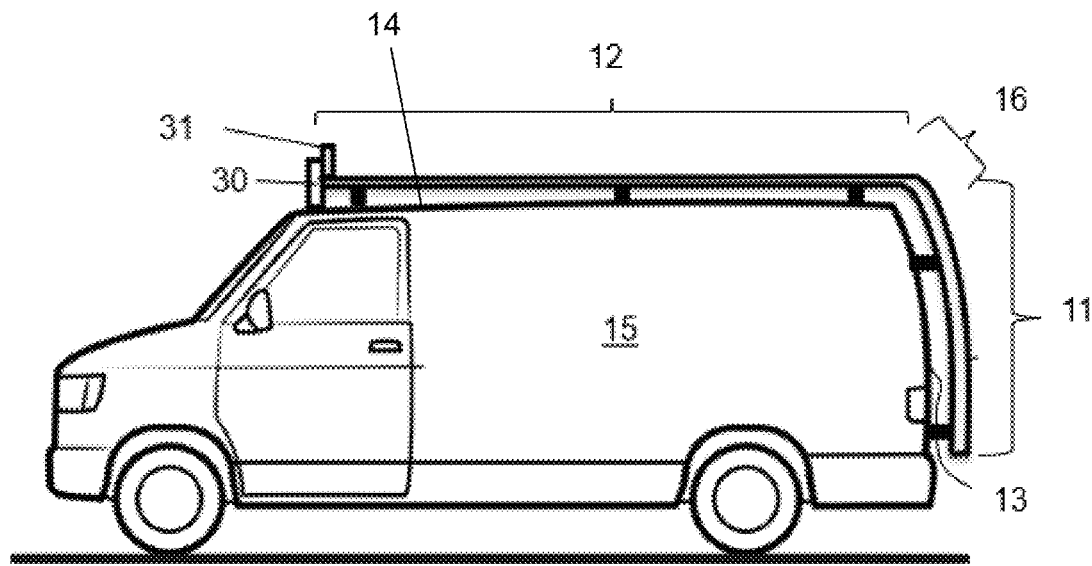
FIG. 6 is a side plan view of a system track configured on a vehicle in accordance with some embodiments of the presently disclosed subject matter.

As shown in FIG. 6, track 10 includes first region 11 that transitions to horizontal second region 12. Particularly, the first region can be positioned adjacent to and run alongside rear face 13 of vehicle 15. In some embodiments, the first region of the track can be vertical or about vertical in orientation. "Vertical orientation" refers to a direction perpendicular to horizontal (e.g., the y axis in the cartesian coordinate system). "About vertical orientation" refers to a state of vertical orientation+/−20 degrees or less, 15 degrees or less, 10 degrees or less, or 5 degrees or less. The track also includes second region 12 positioned adjacent to top face 14 (e.g., roof) of the vehicle. In some embodiments, second region 12 can be horizontal or about horizontal. The term "horizontal" refers to an orientation at right angles to the vertical (e.g., parallel to level ground), such as the x axis in the cartesian coordinate system. "About horizontal" refers to a state of horizontal orientation+/−20 degrees or less, 15 degrees or less, 10 degrees or less, or 5 degrees or less. In some embodiments, the track includes transitional region 16 positioned between the first and second regions, as shown. The transitional region allows for smooth movement of an item along the track between the first and second regions. The transitional region can be rounded region of the track, a squared off region, etc. Thus, the transitional region provides for smooth transition between the first and second regions of the track (e.g., vertical to horizontal transition).

Figure 7:
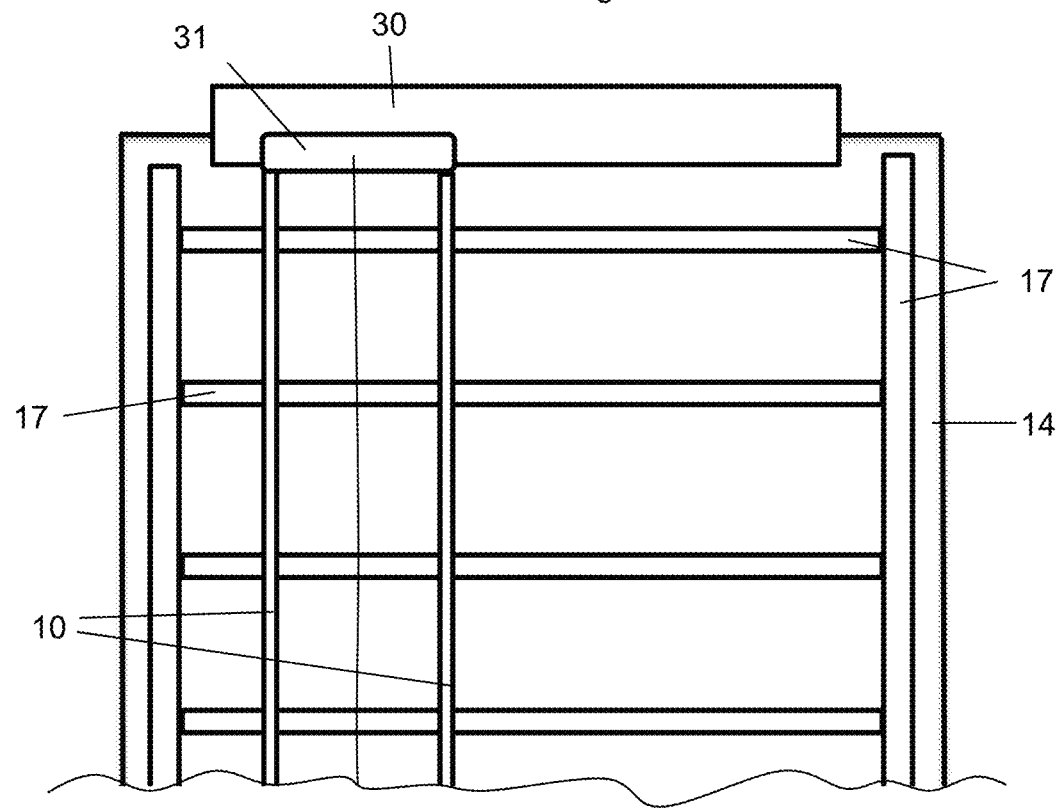
FIG. 7 is a fragmentary top plan view of a vehicle roof comprising a rack and track in accordance with some embodiments of the presently disclosed subject matter.

In some embodiments, the second segment of track 10 can be positioned as part of or in addition to roof support 17 (e.g., a standard or conventional roof rack) that allows cart 20 positioned on the top of the vehicle to be secured, such as with straps. One such embodiment is shown in FIG. 7.

Tracks 10, 11 can be constructed from any suitable rigid material, such as (but not limited to) metal (e.g., steel, stainless steel, aluminum, titanium), metal alloys, plastic, composite materials, or combinations thereof. Any durable material that can resist deformation or damage can be used.

Winch 31 is positioned to cooperate with the distal section of the second track region. The term "winch" refers to any device that may be used to wind up and wind out a cable. In some embodiments, winch 31 may be operated either manually, or using a powered mechanical device including, without limitation, an electrically powered motor, or a gasoline-powered engine. As discussed below, the winch includes cable 32 that is releasably attached to cart 20 and is adapted to control the movement of the cart along the track. In some embodiments, the winch can include a clutch mechanism as known in the art to ensure that excessive load is not put on the cargo and/or vehicle if derailed or in a bind.

Figure 8:
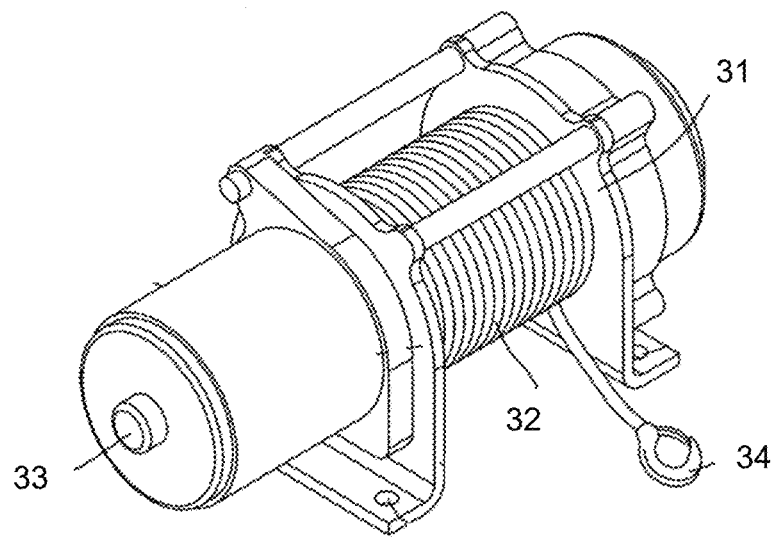
FIG. 8 is a perspective view of a winch in accordance with some embodiments of the presently disclosed subject matter.

One embodiment of a representative winch that can be used with system 5 is shown in FIG. 8. As shown, winch 31 includes cable 32 that can be wound and unwound about central axis 33. The leading end of the cable includes clip 34 that can be releasably attached to cart 20. It should be appreciated that FIG. 8 illustrates one representative example of a winch, although any winch can be used.

Figure 9A:
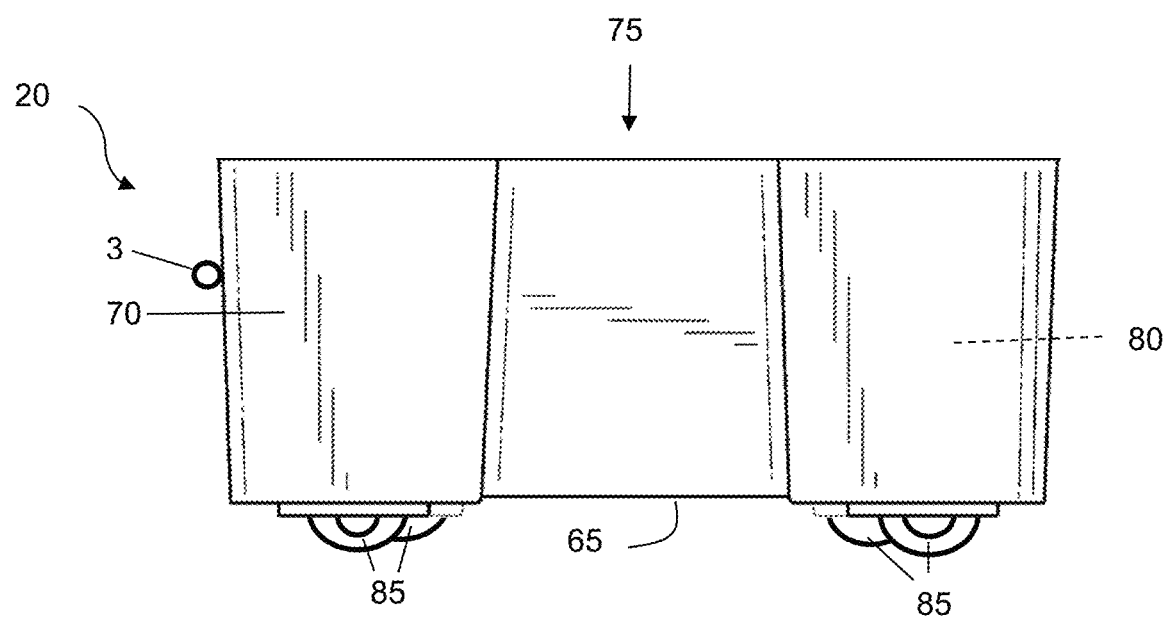
FIG. 9a is a side plan view of a system cart in accordance with some embodiments of the presently disclosed subject matter.

As described above, system 5 also includes roller cart 20 that travels along track 10 to position and remove cargo from the top surface of the vehicle. One embodiment of cart 20 is illustrated in FIG. 9a. As shown, the cart comprises bottom face 65 and sidewall 70 that extends up from the bottom face to form open top 75 that extends into interior 80. The sidewall may have various configurations depending on the vehicle at issue and the type of cargo.

The cart can be configured in any desired color(s) and/or pattern(s). For example, the carts can be customized to represent college team colors, NFL team colors/logos, and the like.

Figure 9B:
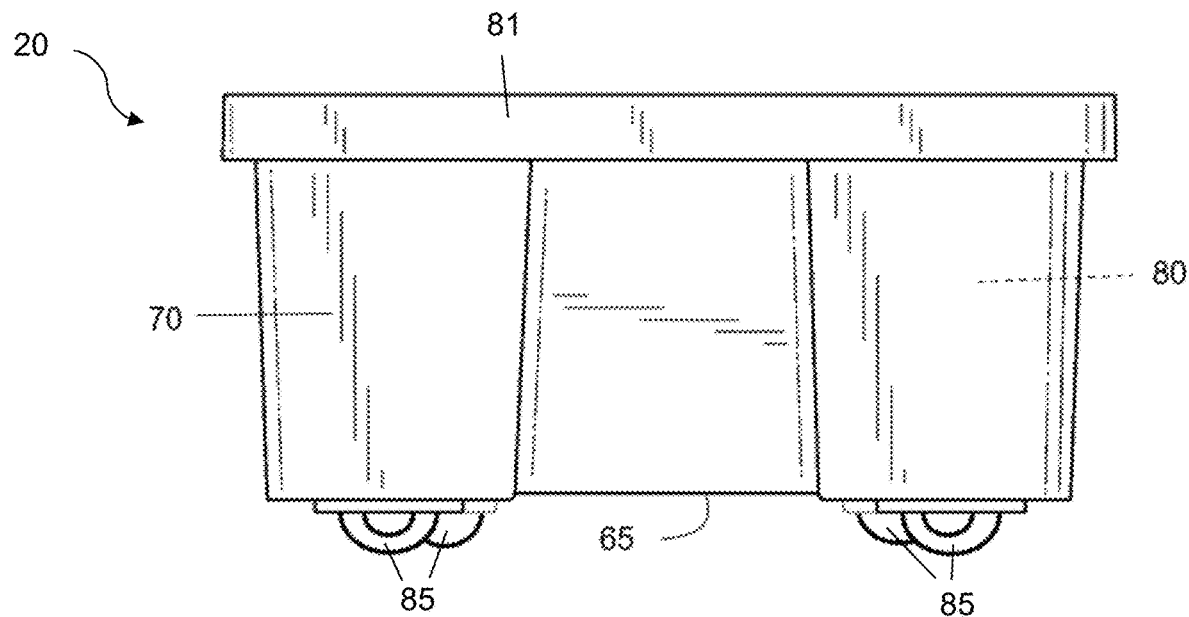
FIG. 9b is a side plan view of a system cart and lid in accordance with some embodiments of the presently disclosed subject matter.

In some embodiments, the cart can include lid 81 positioned at the top edge of sidewall 70 to close the open top, as shown in FIG. 9b. The term "lid" broadly includes any structure that can partially or fully fit on or over the top face of the cart. The lid can therefore prevent any cargo positioned within the interior of the cart from contact with dirt, rain, and the like. In this way, the cargo is protected. However, it should be appreciated that lid 81 is an optional feature.

Figure 9C:
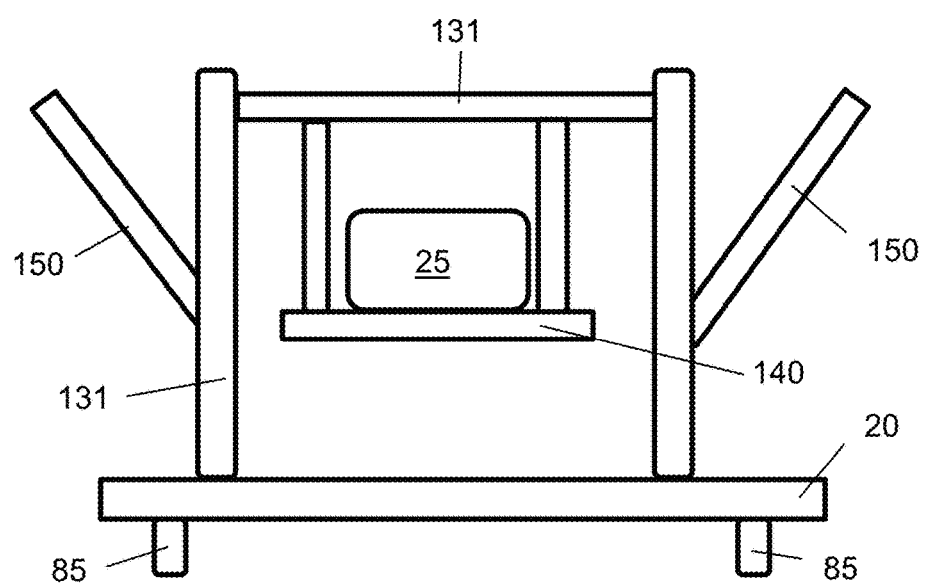
FIG. 9c is a front plan view of a cart comprising a pendulum feature in accordance with some embodiments of the presently disclosed subject matter.
Figure 9D:
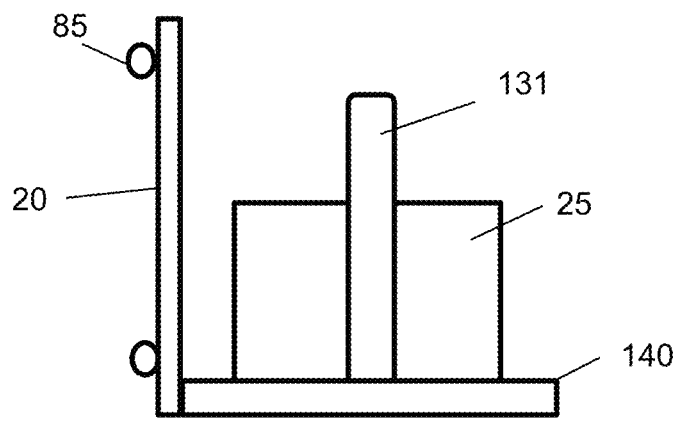
FIG. 9d is a side plan view of the cart of FIG. 9c in accordance with some embodiments of the presently disclosed subject matter.
Figure 9E:
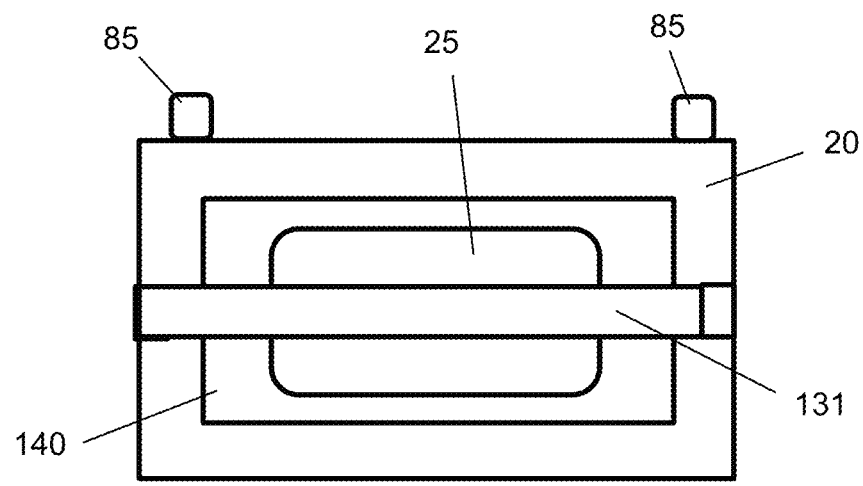
FIG. 9e is a top view of the cart of FIG. 9c in accordance with some embodiments of the presently disclosed subject matter.

In some embodiments, the cart can be configured with a pendulum feature to accommodate movement of a full cooler (or any other suitable cargo). Specifically, when the cargo includes a loaded cooler, melted ice tends to leak from the cooler when positioned in the track in a vertical orientation. As illustrated in FIG. 9c-9e, cart 20 can include a pendulum feature to keep cargo 25 always in a horizontal or about horizontal orientation along the entire track. Cart 20 comprises a plurality of wheels 85 and arms 131 that support and keep upright pendulum support 140 and cargo 25. The arms and pendulum support (and thus the cargo) remain upright (e.g., horizontal), regardless of the orientation of cart 20. In this way, the cooler remains in a horizontal position, avoiding leaks and spills. A pendulum is a device made of a weight suspended from a pivot so that it can swing freely. When a pendulum is displaced sideways from its resting, equilibrium position, it is subject to a restoring force due to gravity that will accelerate it back toward the equilibrium position. When released, the restoring force acting on the pendulum's mass causes it to oscillate about the equilibrium position, swinging back and forth.

Gravity ensures that the weight of the cooler remains in a static position. Once on the roof of the vehicle, swing bars 150 can be used to secure the cargo. The steps can be reversed to unload the cooler.

Figure 10A:
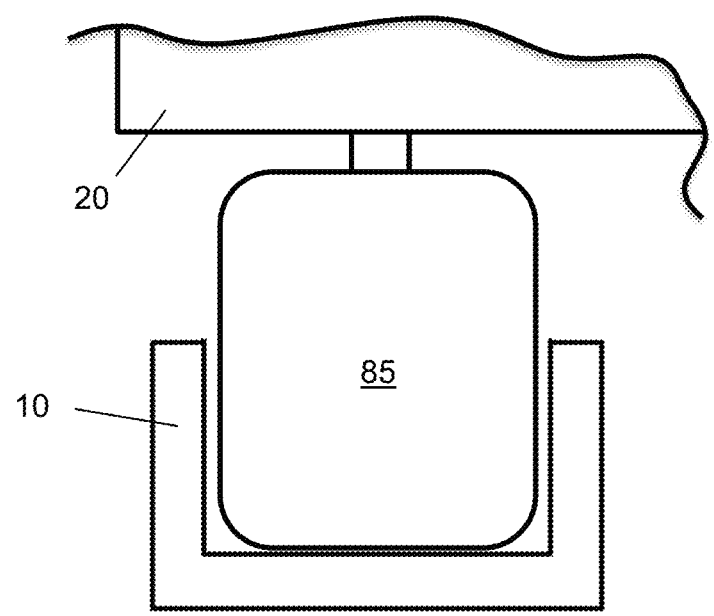
FIG. 10a is a cross-sectional view of a cart wheel positioned in a track groove in accordance with some embodiments of the presently disclosed subject matter.
Figure 10B:
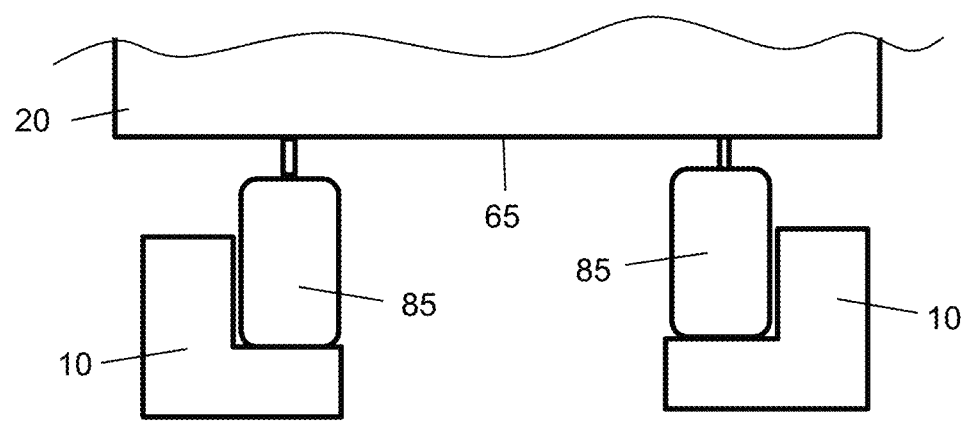
FIG. 10b is a cross-sectional view of a pair of cart wheels positioned in track grooves in accordance with some embodiments of the presently disclosed subject matter.

As noted, one or more wheels 85 can be positioned on the bottom face of the cart. As noted, the wheels cooperate with the grooves in track 10 to guide the cart along the length of the track. For example, in some embodiments, the wheels are sized and shaped to fit into a track groove, as shown in FIGS. 10a and 10b. The wheels are therefore configured to ride/travel along the track between the first and second portions of the track.

Figure 11A:
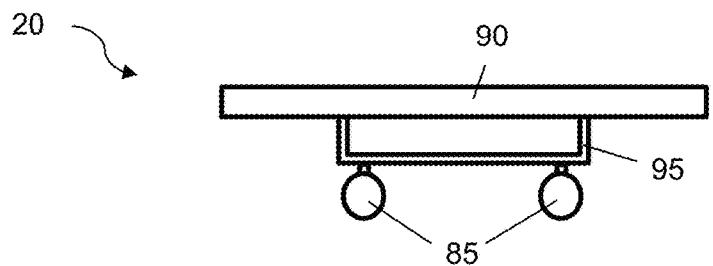
FIG. 11a is a front plan view of a cart in accordance with some embodiments of the presently disclosed subject matter.
Figure 11B:
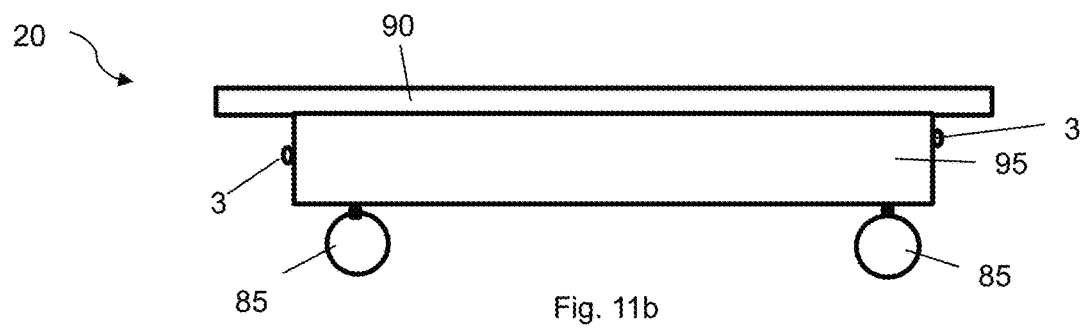
FIG. 11b is a side plan view of the cart of FIG. 10a in accordance with some embodiments of the presently disclosed subject matter.

In some embodiments, cart 20 can be configured as a relatively flat device, allowing cargo to be strapped to a top surface, as shown in FIGS. 11a and 11b. The cart can include base 90 upon which an item of cargo is positioned. The cart also includes support 95 and wheels 85 that cooperate with the track. The cart therefore can be configured as a platform upon which to load cargo.

Figure 12A:
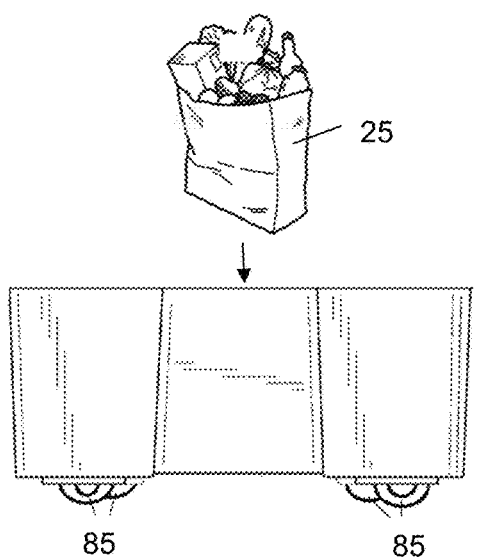
FIGS. 12a-12b are side plan views of loading cargo into/onto a cart in accordance with some embodiments of the presently disclosed subject matter.
Figure 12B:
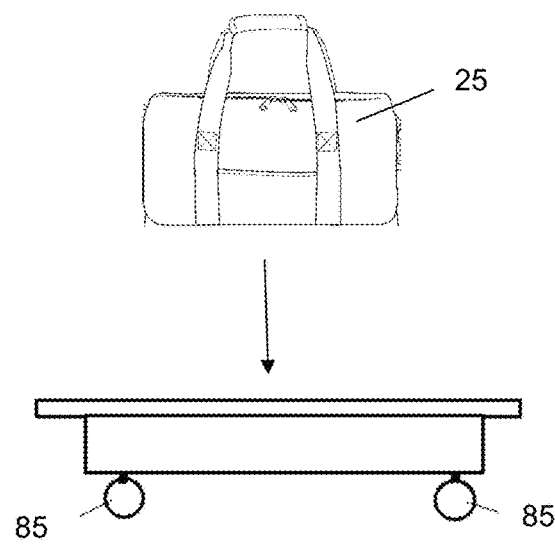

In use, cargo 25 can be positioned on top of or within the interior of a corresponding roller cart 20 using lifting or other similar motion as illustrated in FIGS. 12a and 12b. The cargo can then be releasably attached to the roller cart using any suitable securing element 26, such as VELCRO®, straps, lid 81, and the like. It should be appreciated that the cargo should not exceed the load capacity of the vehicle (e.g., the cargo, cart, track, and any roof rack present).

Figure 12C:
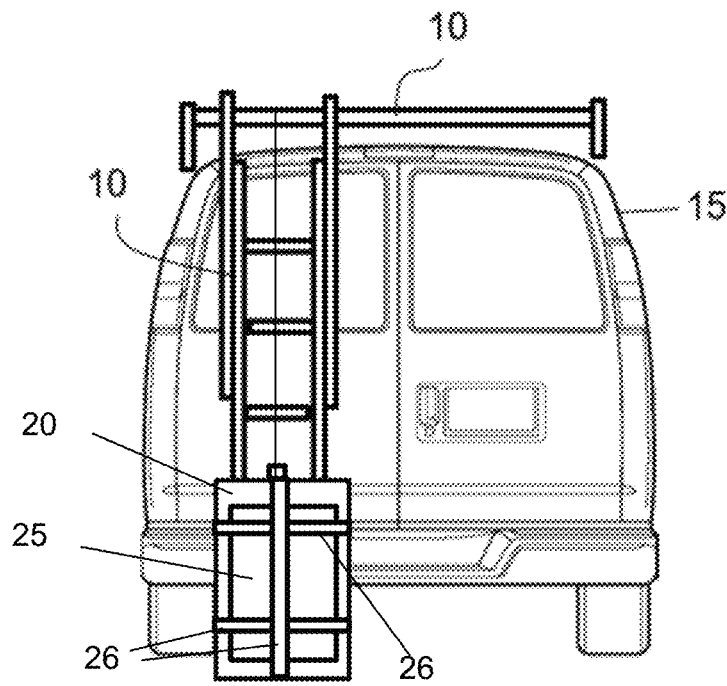
FIGS. 12c-12g illustrate one embodiment of using the system to load cargo onto a vehicle roof in accordance with some embodiments of the presently disclosed subject matter.

Cart 20 is then positioned adjacent to the track at the rear of the vehicle, as shown in FIG. 12c. Winch clip 34 is then hooked onto a front of cart 20 (e.g., to hook 3 or any other element positioned on a front of the cart), thereby connecting the winch to the cart. The winch is then activated (e.g., by wireless remote, manual control, and the like) such that cart 20 is fed into first portion 11 of track 10, ensuring that the cart wheels are lined correctly on the track. The hook can also be positioned on the rear of the cart, or both the front or rear.

Figure 12D:
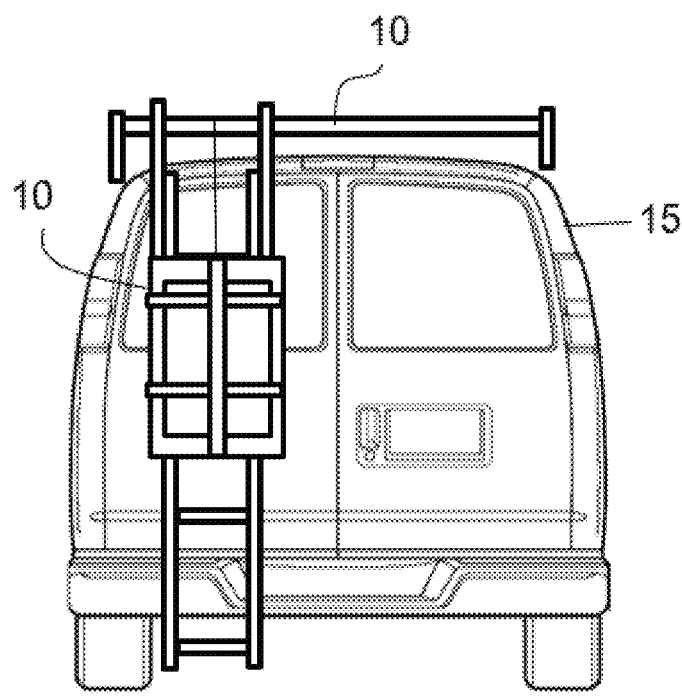
Figure 12E:
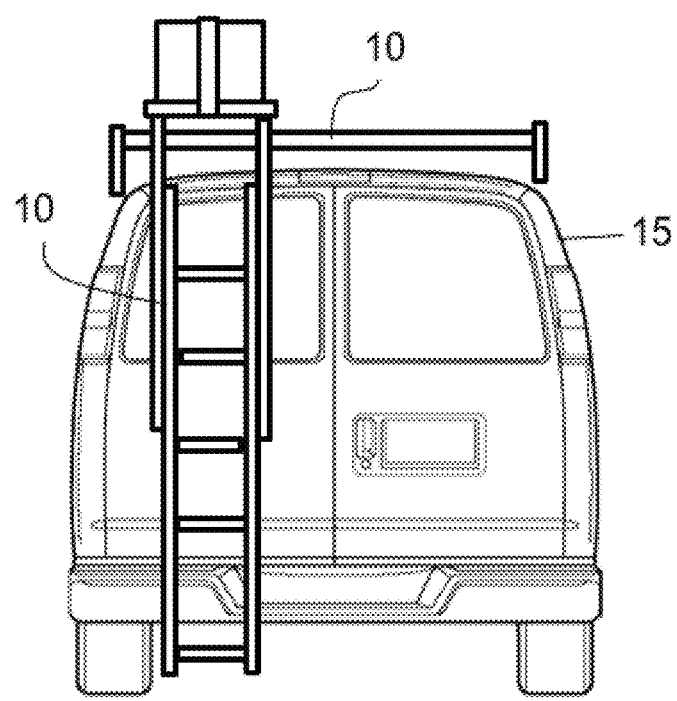
Figure 12F:
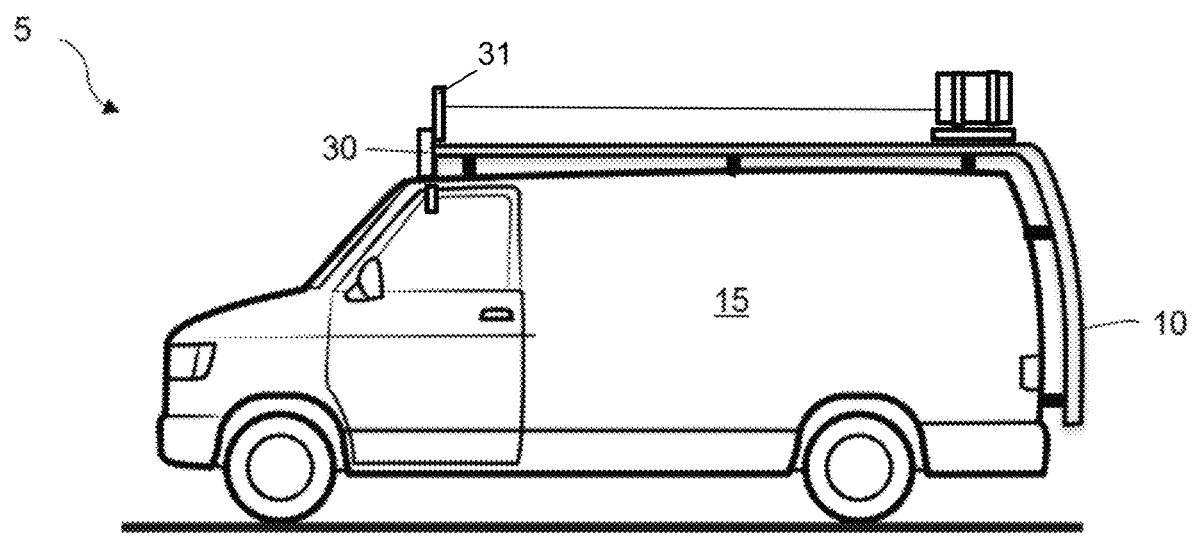
Figure 12G:
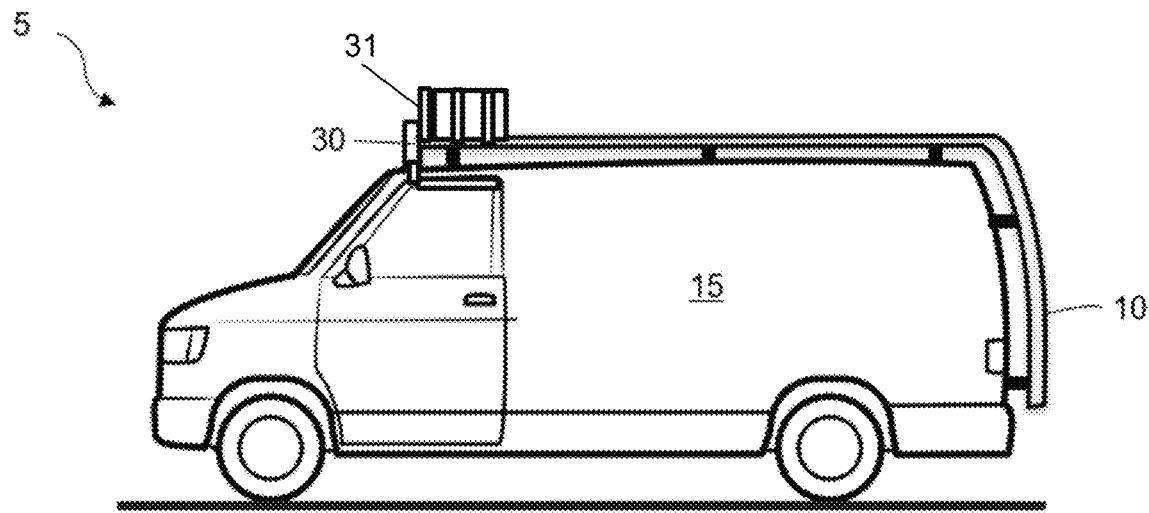

The cart is then advanced along the first portion of track 10 along the back of the vehicle as shown in FIG. 12d by retracting the winch cable. The winch continues to pull the cart and associated cargo from the first region to the second region of the track, as shown in FIG. 12e. Once the cart and cargo reach the horizontal portion of the track, the winch continues to advance the cart to bumper 30 which acts like a stop, as shown in FIGS. 12f and 12g. Bumper 30 therefore allows the cart to come to a stop and rest in a secure position on the top surface of the vehicle. The winch is then unhooked from cart 20. A user can repeat the process for multiple items of cargo if desired. The user can then drive the vehicle to a desired location with cart 20 and cargo 25 securely stowed.

Figure 13A:
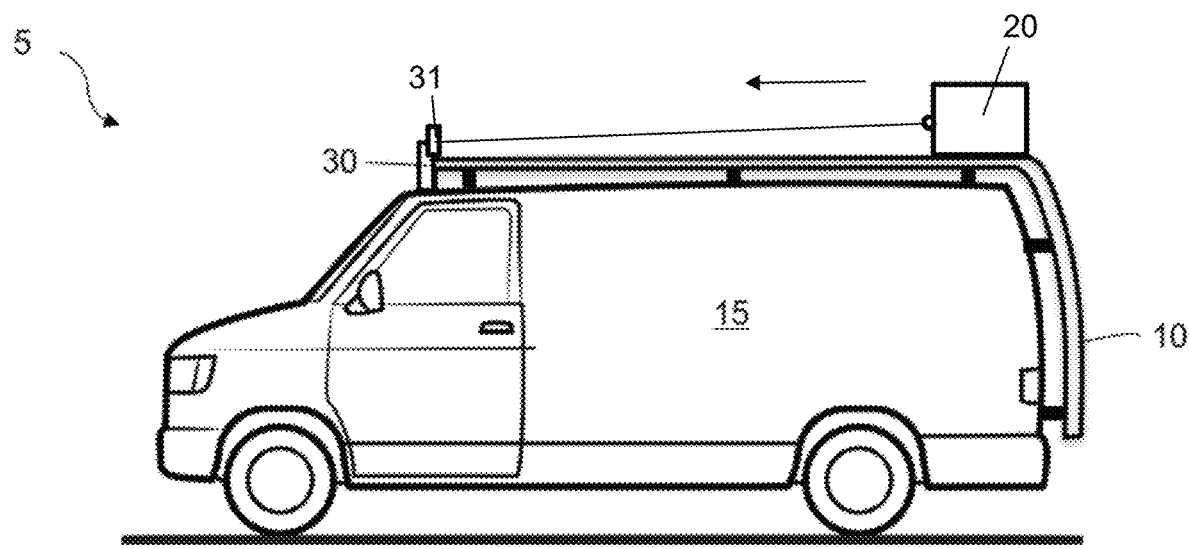
FIGS. 13a-13b are side plan views of loading cargo onto a cart in accordance with some embodiments of the presently disclosed subject matter.
Figure 13B:
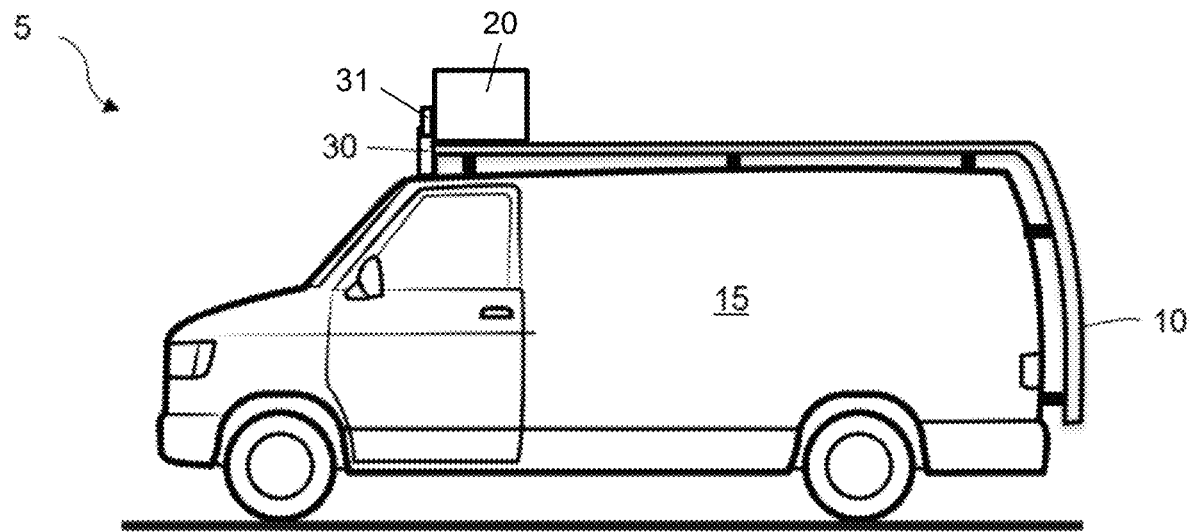
Figure 14A:
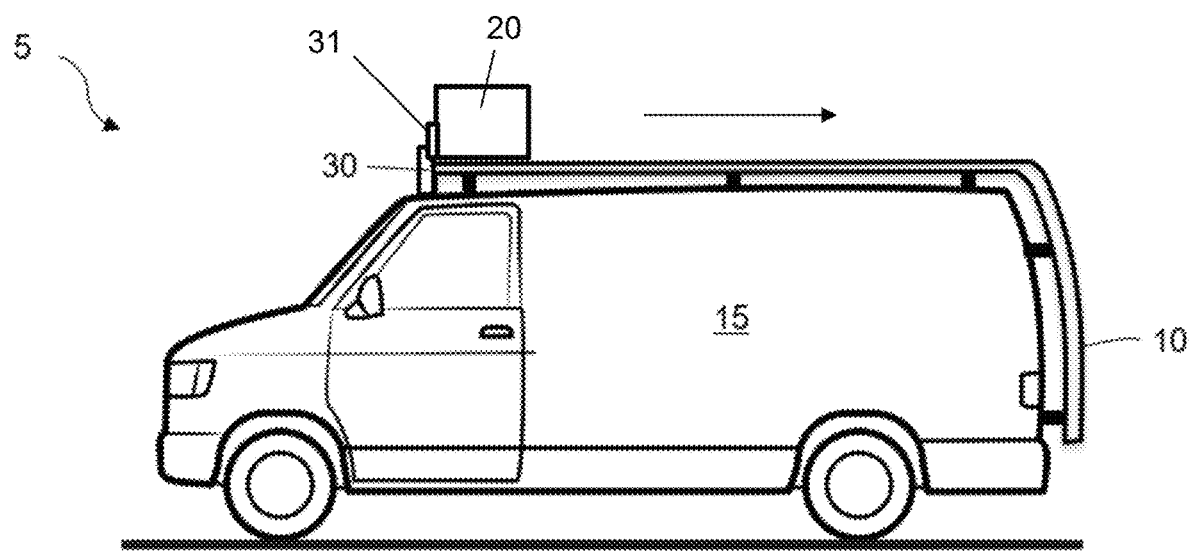
FIGS. 14a-14d are side plan views of unloading cargo from a vehicle roof in accordance with some embodiments of the presently disclosed subject matter.
Figure 14B:
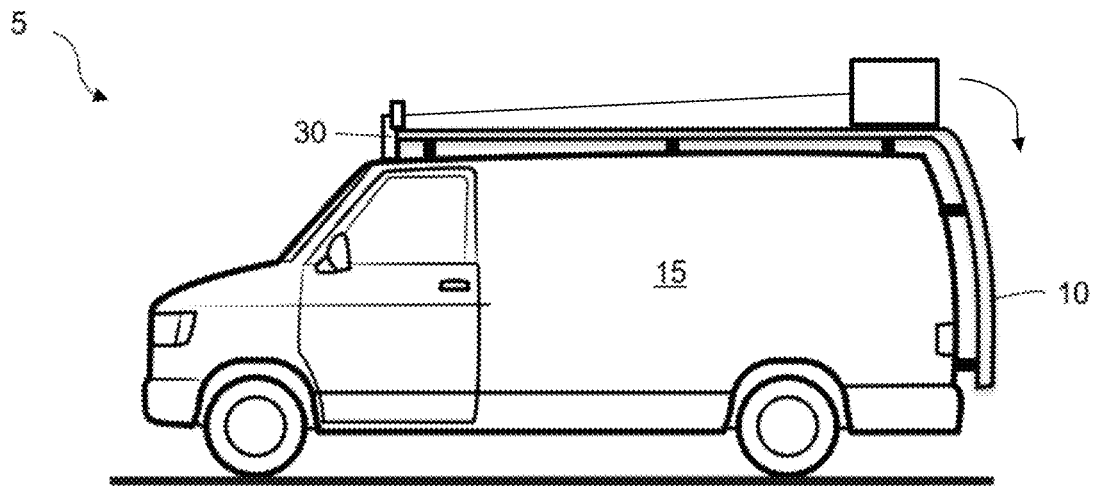
Figure 14C:
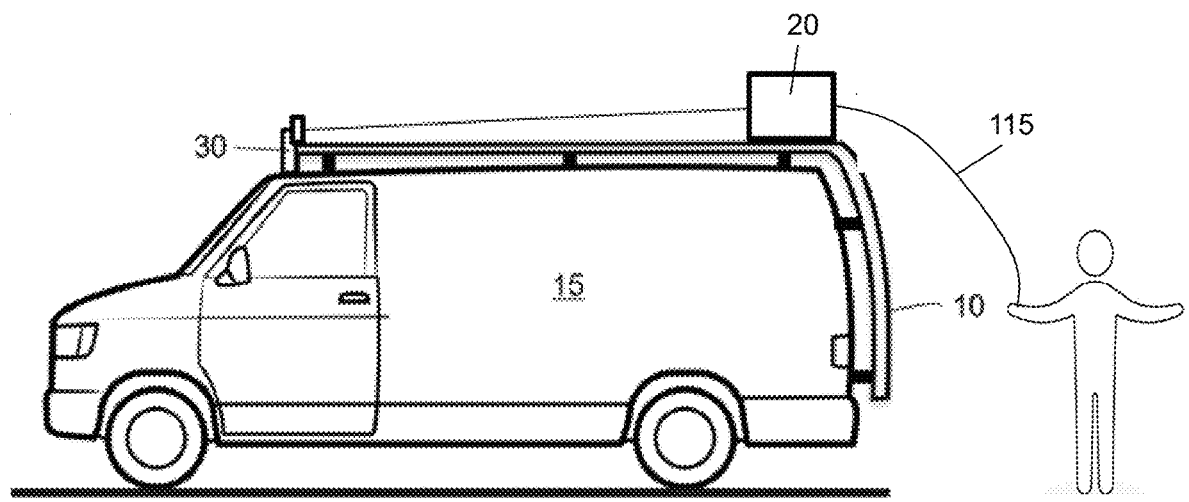
Figure 14D:
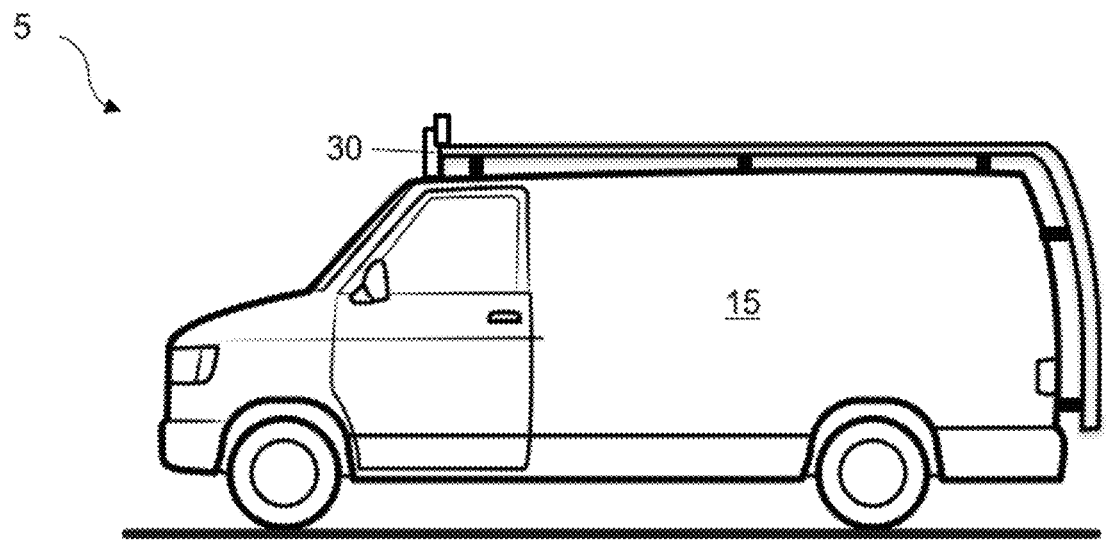

It should be appreciated that although the cart is illustrated as a flat item, any form of cart 20 can also be used, such as the tub variety as shown in FIGS. 13a and 13b.

When the user desires to remove the cart and cargo from the vehicle, the process is reversed. Particularly, the winch is reconnected to a cart winch hook, which is then activated to advance the cart along the second portion of track 10 and then onto the first portion of track 10, as shown in FIGS. 14a-14d. Guide line 115 with a clip can optionally be used to lightly guide the cargo in reverse (e.g., while holding a wireless wench remote). Once the cart reaches the bottom of the vertical region of the track (e.g., adjacent to the ground), the user can unhook the winch and/or guide line and easily access the cart and associated cargo 25.

Figure 15A:
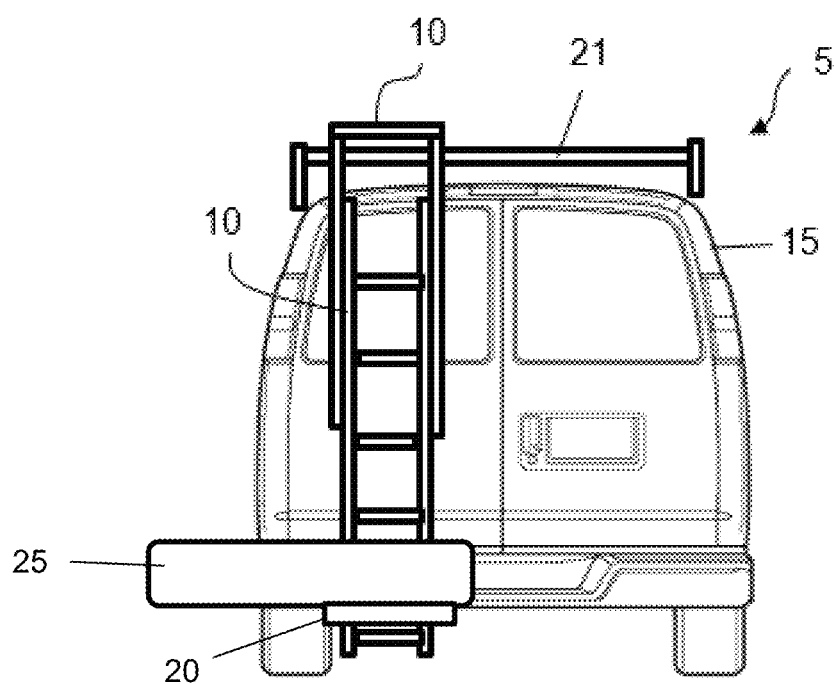
FIGS. 15a-15b are rear plan views of a large item positioned on a cart in accordance with some embodiments of the presently disclosed subject matter.
Figure 15B:
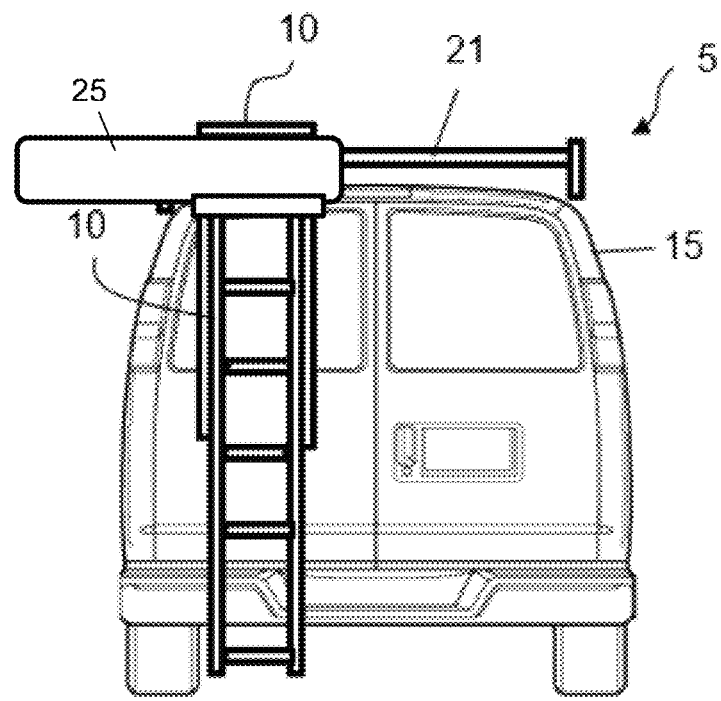
Figure 15C:
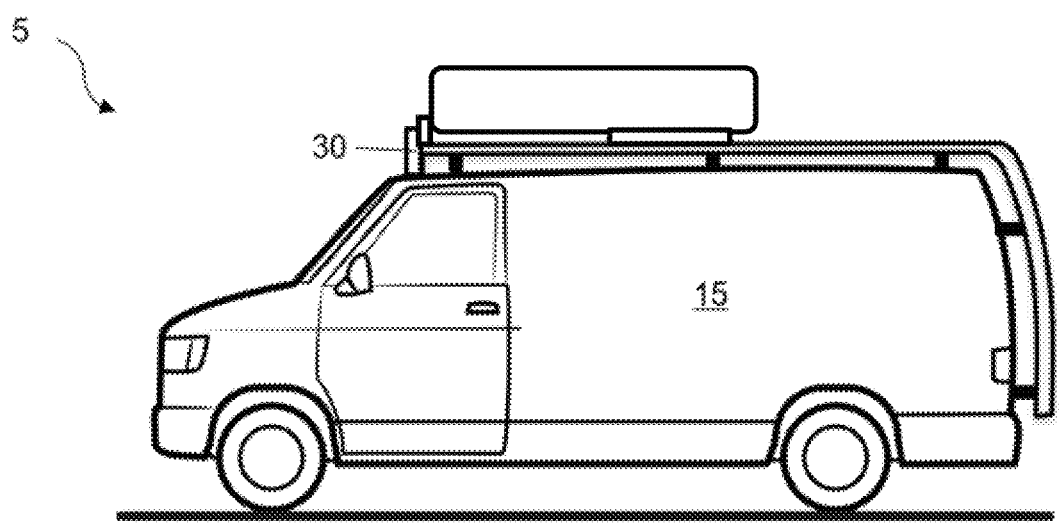
FIG. 15c is a side plan view of a vehicle with a large item positioned on a cart in accordance with some embodiments of the presently disclosed subject matter.
Figure 15D:
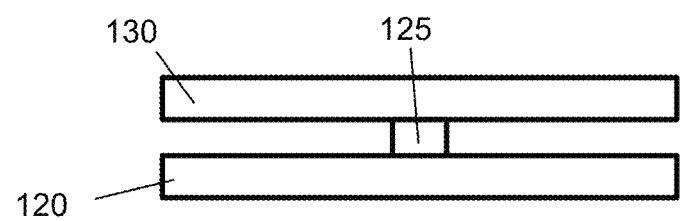
FIG. 15d is a cross-sectional view of a cart with a swivel in accordance with some embodiments of the presently disclosed subject matter.

When cargo 25 is a large or bulky item or items, cart 20 can be extended perpendicularly to the first region of track 10, as shown in FIG. 15a. The bulky item can therefore be loaded perpendicularly onto the track at the rear of the vehicle. The wench can then be attached to cart 20 to advance the item along the vertical portion of the track at the rear of the vehicle as shown in FIG. 15b. Once the bulky item reaches the top portion of the track, it is then rotated to a parallel position (e.g., parallel with the vehicle roof), as shown in FIG. 15c. Any mechanism can be used to swivel the cart and/or cargo, such as a seat swivel lever positioned on a top or bottom surface of the cart. One configuration of the rotating cart includes base 120 with swivel 125 attached between the base and top plate 130, as shown in FIG. 15d. The top plate can therefore swivel 360 degrees if desired to allow a bulky item to be rotated into proper position for movement along the track.

The cargo can therefore be positioned on top of the cart (e.g., with an average height of 30 inches off the ground). The cargo can then be strapped or otherwise releasably attached to cart 20. The winch can be activated to move the item along the vertical track. Once the cargo reaches the roof of the vehicle, a spring pin can then be pulled, allowing the item to pivot to a parallel position (e.g., rotating 90 degrees to be parallel with the vehicle) and lock into place on the top face and horizontal track of the vehicle. The steps can be reversed to remove the item from the vehicle. The cart can pivot or the attachment of the cargo can pivot, thereby rotating the cargo 90 degrees.

The disclosed transport system offers many advantages over prior art systems. For example, system 5 is safe to use and saves the user the effort and danger of lifting heavy cargo items into the interior on top of vehicle 15. Thus, users can avoid unsafe physical movements, such as climbing on top of a vehicle to position or retrieve heavy or bulky cargo 25.

System 5 is easy to use with minimal training.

The disclosed system can be especially beneficial for logistics companies and artisan contractors. For example, the system can enable same day delivery on cumbersome products (especially when compared to shipment of products on large box trucks and tractor trailers).

The disclosed system can save money, providing better fuel mileage on smaller delivery vans versus larger trucks.

Users can move products to job sites and other locations more quickly and safely using fewer employees.

The system can be easily used for tailgating and other outdoor activities.

Multiple carts at a time can be simultaneously loaded or unloaded to the top of the vehicle.

Advantageously, the system maximizes storage space within the vehicle interior by providing secure storage on the top of the vehicle.

The system utilizes stationary tracks that allow carts 20 to flow easily from a vertical to a horizontal position easily and seamlessly.

System 5 does not adversely affect visibility through the rear vehicle window. The system also does not hinder cleaning and maintenance of the rear window. Furthermore, the rear door or rear hatch of the vehicle may be opened without denying access to the vehicle roof.

The disclosed system uses a wireless winching system that is user-friendly.

Advantageously, a single individual can load a large volume of heavy and/or bulky cargo onto and off a large vehicle.

The foregoing description has been set forth merely to illustrate the invention and is not intended to be limiting. Each of the disclosed aspects and embodiments of the invention may be considered individually or in combination with other aspects, embodiments, and variations of the invention. In addition, unless otherwise specified, the steps of the methods of the invention are not confined to any particular order of performance. Modifications of the disclosed embodiments incorporating the spirit and substance of the invention may occur to persons skilled in the art, and such modifications are within the scope of the invention.

What is claimed is:

1. A cargo transport system, the system comprising:
   a track defined by a first end and an opposed second end with a length therebetween, wherein the track includes a pair of first and second rails attached with a plurality of cross members that extend between the first and second rails, wherein each rail includes a groove that extends along the length of the track and wherein the length of the track comprises a first region with a vertical or about vertical orientation and a second region with a horizontal orientation, and a transitional curved region positioned between the first and second regions;
   one or more carts, each comprising a plurality of wheels, each wheel configured to be housed within a track groove, and wherein each cart includes an attachment;
   a bumper positioned at one end of the track, adjacent to the second region, wherein the bumper acts as a track stop;
   a winch comprising a cable configured to be wound and unwound from the winch, each cable including a clip releasably coupled to the cart attachment, wherein the winch is positioned adjacent to the bumper.

2. The cargo transport system of claim 1, wherein the track has a length of about 10-30 feet and a width of about 1-5 feet.

3. The cargo transport system of claim 1, further comprising a track extension positioned at the track first vertical region, wherein the track extension includes a first angled end and an opposed horizontal second end, and wherein the track extension is releasably attached to the first vertical region.

4. The cargo transport system of claim 1, wherein each rail includes a first side and an opposed second side, and the groove is positioned between the first and second sides or the groove is positioned at the first or second side.

5. The cargo transport system of claim 1, wherein the track first region is configured to releasably attach to a vehicle, and wherein the track second region is configured to permanently attach to the vehicle.

6. The cargo transport system of claim 1, wherein the cart is configured to rotate 90 degrees on demand.

7. The cargo transport system of claim 1, wherein the cart is configured as a flat device with a base, the base defined a top surface and an opposed bottom surface that includes the wheels.

8. A method of transporting cargo from a first location to a second location, the method comprising:
   positioning the cargo on or in a cart of the cargo transport system of claim 1 at a first location;
   unwinding the winch cable from the winch and attaching the winch cable clip to the cart attachment;
   positioning a cart wheel within each rail groove at the first region of the track;
   initiating the winch to retract the winch cable towards the winch, whereby the cart is moved along the first region of the track to the second region of the track to contact the bumper at a second location;
   whereby the cargo is transported from the first location to the second location.

9. The method of claim 8, wherein the first location is the ground or a floor and the second location is the roof of a vehicle.

10. The method of claim 8, further comprising strapping the cargo to the cart using straps, cords, hook and loop closure, or combinations thereof.

11. The method of claim 8, wherein the first region of the track is positioned adjacent to a rear of a vehicle.

12. The method of claim 8, wherein the second region of the track is positioned adjacent to the roof of a vehicle.

13. The method of claim 8, further comprising placing a lid on the cart prior to positioning the cart wheels within each rail groove.

14. The method of claim 8, wherein each cart comprises a sidewall that extends upwards from a bottom face of the cart to form an open top that extends into an interior.

15. The method of claim 8, wherein the cart is configured as a flat device with a base, the base defined a top surface and an opposed bottom surface that includes the wheels.

16. A method of transporting cargo from the ground to a roof of a vehicle, the method comprising:
   positioning the cargo on or in a cart of the cargo transport system of claim 1, the cart placed on the ground;
   unwinding the winch cable from the winch and attaching the winch cable clip to the cart attachment;
   positioning a cart wheel within each rail groove at the first region of the track;
   initiating the winch to retract the winch cable towards the winch, whereby the cart is moved along the first region of the track to the second region of the track to contact the bumper at the vehicle roof;
   whereby the cargo is transported from the ground to the vehicle roof.

17. The method of claim 16, wherein the first location is the ground or a floor and the second location is the roof of a vehicle.

18. The method of claim 16, further comprising strapping the cargo to the cart using straps, cords, hook and loop closure, or combinations thereof.

19. The method of claim 16, wherein the first region of the track is positioned adjacent to a rear of a vehicle.

20. The method of claim 16, wherein the second region of the track is positioned adjacent to the roof of a vehicle.

* * * * *